US009202525B2

(12) United States Patent
Gao et al.

(10) Patent No.: US 9,202,525 B2
(45) Date of Patent: *Dec. 1, 2015

(54) CUSTOMIZABLE DATABASE-DRIVEN MENU STRUCTURE FOR A PORTABLE COMPUTING DEVICE

(75) Inventors: Xiuzhi Gao, Mount Prospect, IL (US); Timothy Johnson, Algonquin, IL (US); Jeffrey P. Crowell, Elmhurst, IL (US); Joseph Born, Lincolnwood, IL (US)

(73) Assignees: DIGITAL INNOVATIONS LLC, Lincolnwood, IL (US); ALTO PATENT TECHNOLOGY LLC, Chicago, IL (US); NEUROS TECHNOLOGY INTERNATIONAL LLC, Lincolnwood, IL (US); KNAPP INVESTMENT COMPANY LIMITED, Tortola (VG)

( * ) Notice: Subject to any disclaimer, the term of this patent is extended or adjusted under 35 U.S.C. 154(b) by 941 days.

This patent is subject to a terminal disclaimer.

(21) Appl. No.: 13/412,070

(22) Filed: Mar. 5, 2012

(65) Prior Publication Data

US 2013/0067409 A1  Mar. 14, 2013

Related U.S. Application Data

(63) Continuation of application No. 11/774,068, filed on Jul. 6, 2007, now Pat. No. 8,132,108, which is a continuation of application No. 10/273,565, filed on Oct. 18, 2002, now Pat. No. 7,243,307.

(51) Int. Cl.
*G06F 3/048* (2013.01)
*G11B 27/34* (2006.01)
*G06F 3/0482* (2013.01)

(52) U.S. Cl.
CPC .............. *G11B 27/34* (2013.01); *G06F 3/0482* (2013.01)

(58) Field of Classification Search
None
See application file for complete search history.

(56) References Cited

U.S. PATENT DOCUMENTS

| | | | |
|---|---|---|---|
| 6,121,968 A | 9/2000 | Arcuri et al. | 345/352 |
| 6,385,596 B1 | 5/2002 | Wiser et al. | 705/51 |
| 6,425,609 B2 | 7/2002 | Cheng | 292/5 |
| 6,452,609 B1 * | 9/2002 | Katinsky et al. | 715/716 |
| 2001/0012980 A1 * | 8/2001 | Uchida et al. | 701/208 |
| 2002/0002039 A1 | 1/2002 | Qureshey et al. | 455/344 |
| 2002/0070979 A1 | 6/2002 | Hong | 345/814 |
| 2003/0007012 A1 * | 1/2003 | Bate | 345/825 |
| 2003/0084056 A1 | 5/2003 | DeAnna et al. | 707/100 |
| 2003/0229537 A1 | 12/2003 | Dunning et al. | 705/10 |

OTHER PUBLICATIONS

International Search Report, PCT/US03/33579, May 5, 2004, 1 page.

* cited by examiner

*Primary Examiner* — Thanh Vu
(74) *Attorney, Agent, or Firm* — Anova Law Group, PLLC

(57) ABSTRACT

A portable media playing device incorporating a menu structure. The device includes a display mechanism, a navigation database, including a navigation record with a navigation description, and an action database, including an action record with an action description. The action database is customizable. A display driver displays the navigation description. When the navigation description is selected, the display driver displays the action description. When the action description is selected, a digital synchronization system generates an extra action request (EAR) record that includes an action identifier and action data for storage in an EAR database. When the device is synchronized with a computer, a synchronization manager accesses the EAR database and updates the action database with any new action records.

18 Claims, 7 Drawing Sheets

| Audio Title Action Menu | | | | |
|---|---|---|---|---|
| Description | Select Display | Input | Action | |
| Open | File details | | Display details | 402 |
| Play | Now Playing screen | | Adds to top of play queue | 404 |
| Delete | Delete confirm | Yes/No/PC delete | Deletes file | 406 |
| Add to queue | | | Adds to bottom of play queue | 408 |
| Add to playlist | Playlist table | Playlist | Adds to playlist | 410 |
| Get it | | | Gets the file | 412 |
| Exit | | | Exits the extra information menu | 414 |

| Word | Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|
| 0 | | colspan dataLength |||||||||||||||| 
| 1 | | reserved |||| dspTmplt ||| itemNum |||||||||
| 2-7 | | headerOfItem0 ||||||||||||||||
| 8-13 | | headerOfItem1 ||||||||||||||||
| ... | | ... ||||||||||||||||
| N*6+2 - N*6+7 | | headerOfItemN ||||||||||||||||

| Word | Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|
| 0 | | type || actionID ||||||||||||||
| 1 | | reserved ||||||||||||||||
| 2-3 | | pDspData ||||||||||||||||
| 4-5 | | pActionData ||||||||||||||||

| Word | Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|
| 0 | | type || dataLength |||||||||||||||
| 1 - N | | data[ ] ||||||||||||||||

| Header Name | Word |
|---|---|
| Manufacturer ID | 0 |
| Product ID | 1 |
| Device OS Version | 2-3 |
| Reserved | 4-13 |
| Ear Signature | 14-15 |

| EAR Entry Name | Word |
|---|---|
| Sync ID | 0 |
| Length | 1 |
| Action ID | 2 |
| Action Data | 3 |
| Checksum | M+3 |

CUSTOMIZABLE DATABASE-DRIVEN MENU STRUCTURE FOR A PORTABLE COMPUTING DEVICE

BACKGROUND OF THE INVENTION

1. Field of the Invention

The invention relates generally to an apparatus and method for operating a portable multimedia device. More particularly, the invention is directed to an apparatus and method for providing a customizable database-driven menu on a portable media device, such as a portable MP3 player.

2. Description of Related Art

Portable consumer electronics devices (portable devices), such as cell phones, were initially created with the goal of providing as many options as possible in a menu structure without including too much overhead, such as executable programs or complex operating systems (OSs). A portable device, as used herein, is a device that can be conveniently carried and used by a human. These menu structures are generally installed once, at the time of manufacture. For example, portable MP3 players such as the IPOD™ and the NOMAD JUKEBOX 3™ have menu options such as "delete" and "add to playlist" hard-coded into the device's firmware. While these devices maintain a database of audio files, the database is typically only used to view song information. In the case of the IPOD™, the database is also used to view contact or calendar information, which can be modified via a personal computer (PC) only. Also, current portable MP3 players do not allow functions to be initiated on the portable device that will later be executed on the PC or some other remote computer. For example, the user of a portable device is unable to select a remotely stored audio file for future download by a synchronizing computer. A remote source is a source of a file or data that must be accessed via an external port, such as a wireless or wireline port.

To make up for the inflexibility of simple non-customizable menu structures, some mobile devices, such as personal data assistants (PDAs), include more complex portable OSs such as the PALM™ OS, the WINDOWS™ CE OS, or the LINUX™ OS. These portable OSs typically have complex menu structures that mirror those of full PC non-portable OSs, such as the various WINDOWS™ desktop OSs.

In addition, while being flexible, these portable OSs require input mechanisms such as keyboards and/or styluses with handwriting recognition. No modern PDA allows interactivity with only a simple input mechanism, such as keys or a four position joystick. Such OSs also require full graphical user interfaces (GUIs) that have relatively large display areas and high resolution requirements.

The complexity of such OSs also demands additional resources, such as memory and processor power. Furthermore, the complexity and size of input and output mechanisms and their portable OSs makes modern PDAs expensive, heavy, cumbersome, and unsuitable for certain uses, such as use while exercising.

Such OSs have an additional drawback; their OS architectures require that applications be developed using tools similar to those used for PC applications. Developing these applications is a complex process that requires a great deal of skill. Moreover, these applications are typically free-standing or independent such that a database in one application is not easily accessible by another application. Furthermore, updates to the basic menu application structure or GUI typically involve either reinstalling or updating the OS.

In light of the above, there is a need for a menu structure for a portable media device that is simple to operate and customize.

BRIEF SUMMARY OF THE INVENTION

The present invention provides a database-driven portable device menu support system comprising a database-driven menu tree or hierarchical menu structure, an action menu, a dynamic synchronization system (DSS), and an extra action request (EAR) subsystem, to implement an expandable and customizable menu system. In this invention, the menu tree is defined by database files, the action menu provides extra descriptions or actions for a currently selected menu item, and the DSS and EAR subsystem provide two-way communication between a portable device and a computer. The database-driven menu structure is less complex than a GUI of a full-fledged OS, thereby being simpler to operate and customize.

In a preferred embodiment, a portable media player incorporates a database-driven menu structure. The portable device includes a navigation database and a display driver that displays a navigation menu with navigation descriptions of navigation records in the navigation database. The portable device also includes an input mechanism used to select a navigation description that is associated with a media file. Then, the display driver displays an action menu with action descriptions of action records in an action database, where the action descriptions are associated with the media file. The input mechanism is used to select an action description, which initiates an action associated with the action selection. As an alternative, the navigation description is associated with an item other than a media file, such as a playlist.

In another preferred embodiment, when the navigation description is selected, the action menu structure generated from the action database is dynamic. In this embodiment, when the action menu is generated, some action descriptions are displayed only if a field of the associated action record has a requisite value. This requisite value may be determined from a field of the navigation record associated with the selected navigation description. Alternatively, the action menu structure is dynamically generated based on the menu tree traverse history such that certain action menus are brought up only when the menu is traversed along a certain path.

In yet another preferred embodiment, the invention is a portable media device synchronization system, including a portable media player and a computer with which the portable media player be synchronized. The computer is preferably coupled to a network (either directly or indirectly (through a dial-up connection to example). In this embodiment, the action database is customizable. The computer is coupled to the portable media player through an interface. Action data on the computer is used to update the action database of the portable media player. The action data may be obtained from a script written by the user or downloaded from the Internet or from some other location. Alternatively, the portable media player has a wireless interface and may obtain action data from a wireless-accessible network and update the action database accordingly.

In still another preferred embodiment, an extra action request (EAR) database contains EAR records that preferably have multiple fields with one EAR field having an action identifier. An EAR record is generated and stored in the EAR database when an action description is selected. When the portable device is synchronized with the computer, the computer has access to the EAR database. In this way, the computer acquires the action identifier and performs an action in accordance with the action identifier. The EAR record will preferably also include data from the navigation database that is necessary for executing the action. The EAR record can also include menu position information, such as which item is selected from which menu since the DSS has full access to the menu tree traversal history.

The benefit of the customizable action database is that it facilitates the inexpensive production of additional menu scripts that are easily implemented on a portable device. Also, since the menu structure is database-driven, storing the data does not require much space or processing and updating the menu structure does not require reinstalling or updating the OS. This makes the invention ideal for implementation on a portable device. In addition, whereas a customizable action database may still have static action menus that are associated with a navigation description, the use of dynamic action menus reduces redundancy in the database because the action menu items may be selected "on the fly" for any selected navigation description.

A benefit of using an EAR database is that actions can be identified immediately at the synchronization layer when a portable device and computer are synchronized. The information is available from the EAR database itself, so an executable program need not be transferred from the portable device to the computer or vice versa.

Another benefit of using the customizable database is that it provides expedited querying from the user's perspective. As compared with the prior art, because the EAR file is populated with detailed information from the position on the menu where the action was initiated, a query that sends a significant amount of information to a server can be initiated with just a few clicks of a four-position joystick as compared to entering information using the prior art stylus or full keyboard, as would be the case with a typical Web interaction.

BRIEF DESCRIPTION OF THE DRAWINGS

For a better understanding of the nature and objects of the invention, reference should be made to the following detailed description, taken in conjunction with the accompanying drawings, in which:

FIGS. 5A, 5B, and 5C are menu data formats as used in an embodiment of the present invention;

Like reference numerals refer to corresponding parts throughout the several views of the drawings.

DETAILED DESCRIPTION OF THE INVENTION

Figure 1:
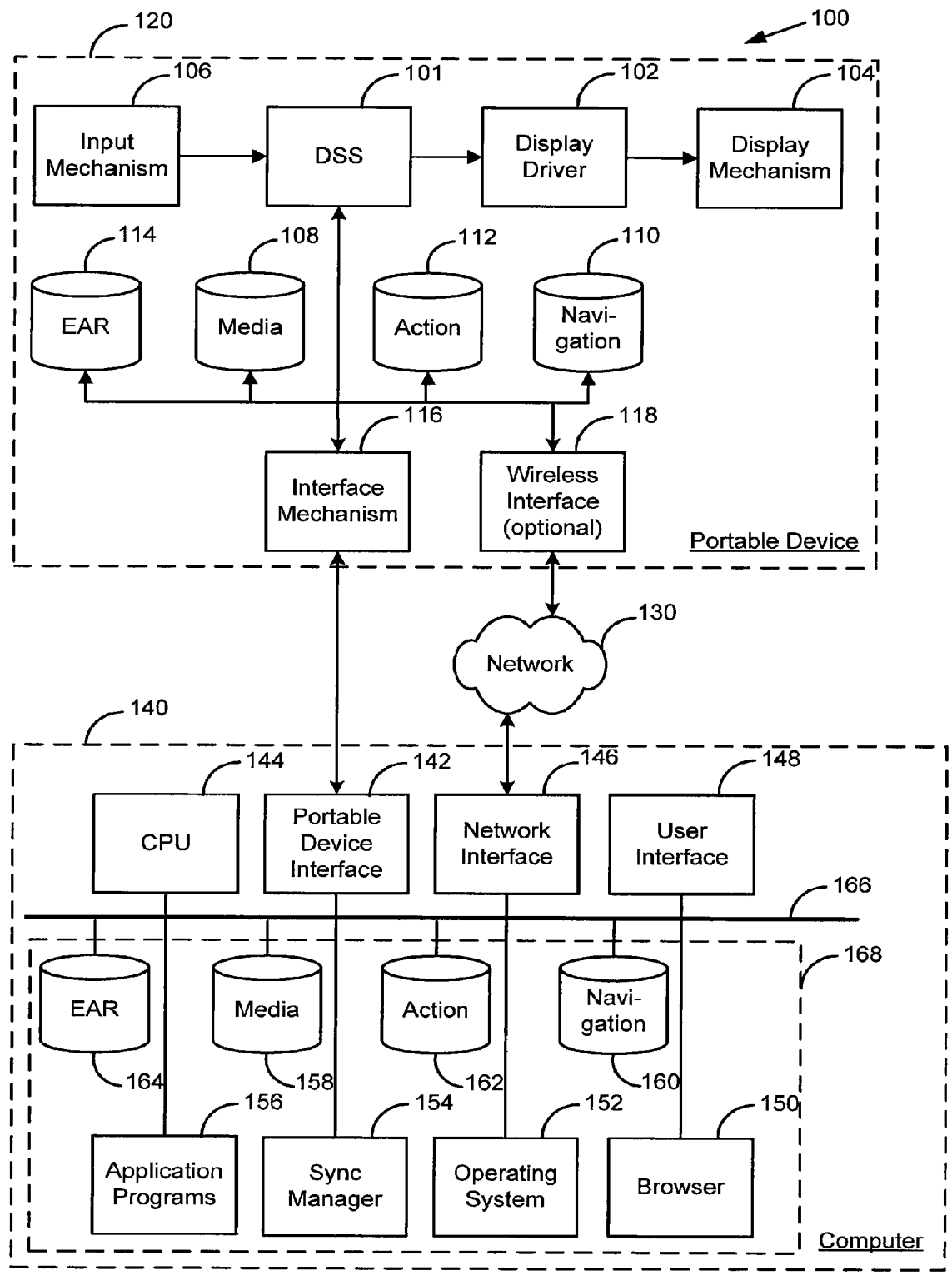
FIG. 1 is a block diagram of a system for operating a portable device, according to an embodiment of the present invention.

FIG. 1 shows a system 100 for operating a portable device. The system 100 includes a portable device 120, a network 130, and a computer 140. At any given time, the portable device 120 need not be connected to the computer 140 or to the network 130. Also, at any given time the computer 140 need not be connected to the network 130. The portable device 120 is a computing device that may be conveniently worn or carried and operated by a human. The network 130 is preferably the Internet, but could be any network, such as a LAN or wireless network. The computer 140 is preferably a personal computer (PC), such as a desktop, laptop, notebook, palmtop computer, or any other computing device that is capable of being connected to the portable device 120 and/or the network 130. In an alternative preferred embodiment, the computer 140 is a server, such as a network Internet server.

A portable device 120 that has a database-driven menu structure will have a database. The database includes a plurality of records where each record is associated with a menu item in the menu structure. Since the menu structure must normally be displayed to a user of the portable device, one of the fields of each record is typically a description field. A display driver displays the contents of the description field as a menu item. Other fields in the record may contain additional, conveniently accessible data.

The portable device 120 is preferably a media player, such as an MP3 player. The portable device 120 preferably comprises a digital synchronization system (DSS) 101, a display driver 102, a display mechanism 104, an input mechanism 106, a media file database 108, a navigation database 110, an action database 112, an extra action request (EAR) database 114, an interface mechanism 116, and an (optional) wireless interface mechanism 118. It should be noted that the databases 108, 110, and 112 may be implemented in one or more databases, and are only illustrated in FIG. 1 as separate databases for ease of description. These databases may have a tree-like structure wherein, for example, a first database entry is associated with a second database entry as a parent of the second entry. Though referred to as a database for ease of description, the EAR database 114 could, for example, be implemented as a queue or some other data structure or could simply be a collection of files. Also, the display driver 102 may be an integral part of the DSS 101.

The DSS 101 preferably includes a processor. One function of the DSS 101 is to run a database-driven menu structure system. A database-driven menu structure is a menu structure wherein each menu item is a field of a record in a database and wherein a display driver 102 displays the menu item in accordance with a pre-defined menu structure. The menu structure is hierarchical such that a user may "drill down" to a leaf node (the lowest level) of the menu structure or back up towards the root (the highest level) of the menu structure. A hierarchically higher node is referred to as a "parent" and a hierarchically lower node beneath the parent is referred to as a "child." A database-driven menu is one "level" of a database-driven menu structure, where each menu item is typically the child of a common parent. Additional menu items that do not have common parents are possible, such as a "power off" menu item selection, which might have neither a child nor a parent. A database-driven menu may be referred to as a displayed database-driven menu structure. When there are many menu items associated with a given level of the menu structure, the menu structure may be larger than can be displayed on a display device. Accordingly, an optional "scrolling" function is desirable for use in conjunction with the menu.

The display driver 102 drives the display mechanism 104, which is preferably a monochrome or color display. A user of the portable device 120 provides input through the input mechanism 106, which is preferably a four-point joystick or a touchpad. In addition, the portable device 120 preferably stores a plurality of media files, or a list of media files, in a media file database 108. Media files preferably contain media content (as opposed to pure text) such as audio or video content. In a preferred embodiment, the media files are in a compressed format, such as MPEG or MP3.

The navigation database 110 contains navigation records having navigation fields. A navigation record is a record that has a navigation description field and one or more other fields that are associated with the navigation description field. Each navigation record corresponds to a navigation menu item that is displayed by the display driver 102. In other words, the navigation description is a menu item that is associated with a navigation menu. A navigation description field of each navigation record includes a navigation description. The navigation description is the text or icon that is the navigation menu item as displayed. The navigation record includes other navigation fields that are associated with the navigation menu item, as well.

The action database 112 contains action records with action fields. An action record is a record that has an action description field and one or more other fields that are associated with the action description field. An action description field includes an action description that is the action menu item as displayed by the display driver 102. In other words, the action description is a menu item that is associated with an action menu. The action menu contains action menu items. The action record includes other action fields that are associated with the action menu item, such as an action identifier field. Further details of the action records are described below in relation to FIGS. 4 and 5.

The EAR database 114 contains EAR records with EAR fields. One or more action data fields in the EAR database comprise data necessary to execute an action. An action identifier field includes an action identifier. Further details of the EAR records are described below in relation to FIG. 7.

The interface mechanism 116 enables coupling the portable device 120 to the computer 140. In one embodiment, the interface mechanism 116 is a universal serial bus (USB) port. The (optional) wireless interface 118 enables coupling the portable device 120 to the computer 140 via a wireless network 130.

The computer 140 preferably comprises a portable device interface 142, a CPU 144, a network interface 146, a user interface 148, memory 168, and a bus 166 that connects the aforesaid components. The memory 168 further preferably comprises a browser 150, an operating system 152, a synchronization manager 154, application programs 156, a media file database 158, a navigation database 160, an action database 162, and an EAR database 164. It should be noted that the databases 158-162 are optional. In an embodiment these databases are used to facilitate synchronizing with the portable device 120. Accordingly, after synchronizing with the portable device 120, the databases 158-162 contain the same data as the databases 108-112 on the portable device 120.

The portable interface 142 enables coupling the computer 140 to the portable device 120. In one embodiment, the portable interface 142 is a USB port. The network interface 146 enables coupling the computer 140 to the network 130. The user interface 148 preferably includes one or more input devices, such as a mouse or keyboard, and one or more output devices, such as a monitor. The synchronization manager 154, which may include an XML database, provides functions including caching content, setting of configuration and preferences at the computer 140, signing up for subscriptions and such through, for example, the browser 150, as well as inbox database management of the portable device 120 at the computer 140. Inbox database management may include procedures for conflict resolution, prioritization, overwriting old content, etc. When the portable device 120 is coupled to the computer 140 to perform synchronization, the synchronization is preferably automatic and transparent. During synchronization, the synchronization manager 154 accesses the databases 108-114 of the portable device 120 through the portable interface 142 and interface mechanism 116. In an alternative embodiment, the synchronization manager 154 accesses the databases 108-114 through the network interface 146, the network 130, and the wireless interface 118.

Figure 2:
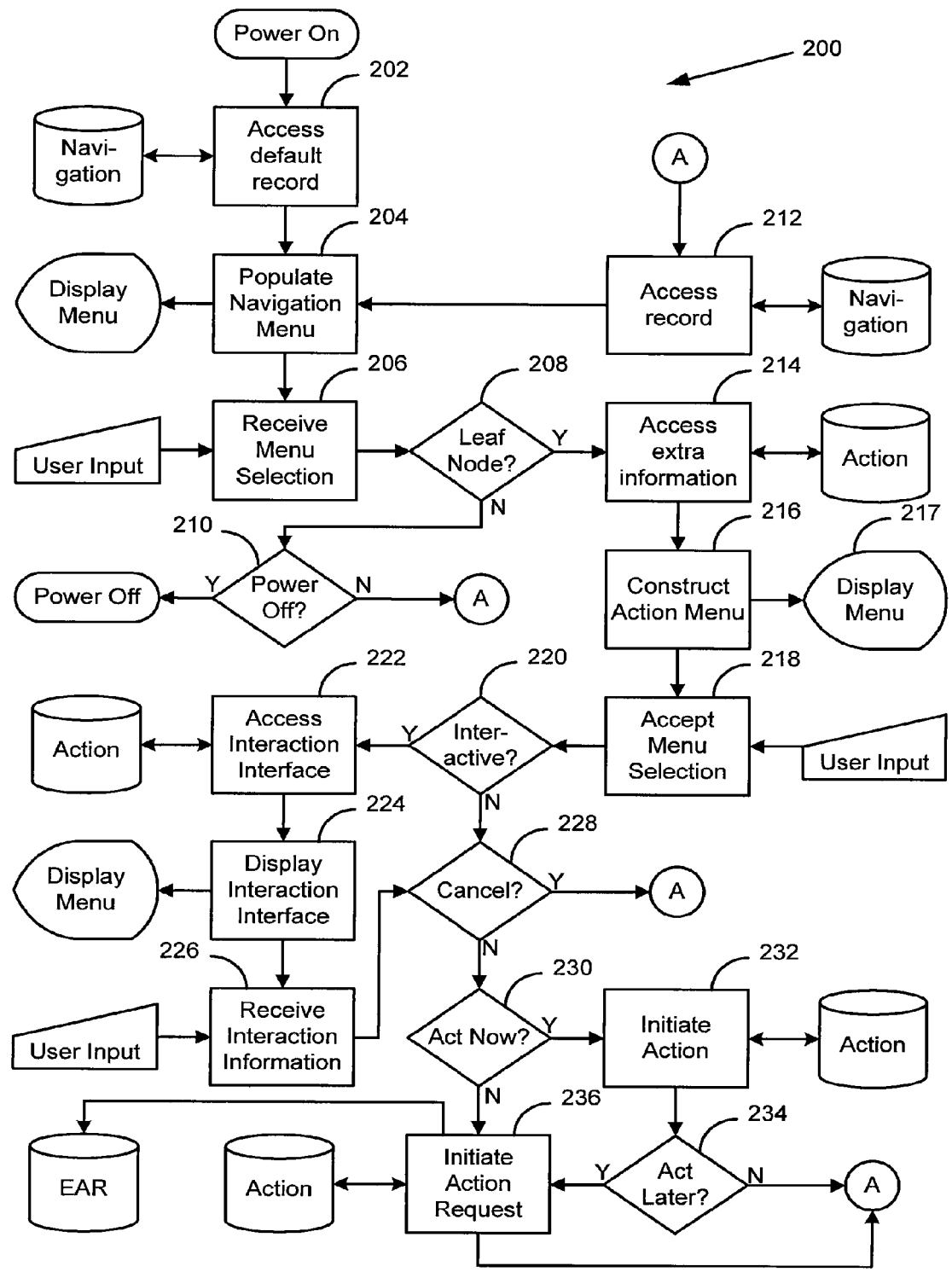
FIG. 2 is a flow chart illustrating the use of a database-driven menu structure on a portable device, according to an embodiment of the present invention.
Figure 3A:
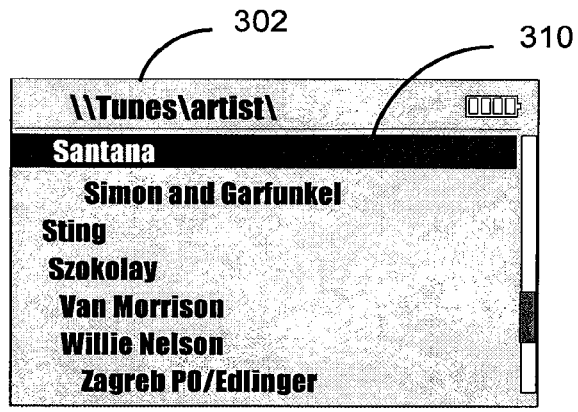
FIGS. 3A, 3B, and 3C are exemplary screen-shots of a display of a portable device, as operated in accordance with an embodiment of the present invention.

FIG. 2 illustrates the use of a database-driven menu structure in the portable device 120 (FIG. 1). After the portable device is powered on, the DSS 101 (FIG. 1) accesses one or more default navigation records from the navigation database 110 (FIG. 1) at step 202. The display driver 102 (FIG. 1) then populates a menu structure, at step 204, that is displayed on the display mechanism 104 (FIG. 1). The menu structure includes the one or more navigation descriptions that are associated with the navigation records. The navigation descriptions describe many different types of navigation database records, including: media on the device, Internet radio stations, broadcast radio stations, and media on a remote server. In alternative embodiments, the navigation descriptions describe other navigation database records, such as street or map addresses. For example, a user may access geographical maps by navigating through a hierarchical menu structure of addresses or locations. Thus, it should be appreciated that the menu structure may navigate through many different types of data. FIG. 3A shows an exemplary navigation menu structure display 302.

The DSS 110 (FIG. 1) then receives a menu selection input by a user of the portable device 120 (FIG. 1) via the input mechanism 106 (FIG. 1), at step 206. With reference to FIG. 3A, the menu selection is preferably accomplished by highlighting a navigation description 310, such as an artist name (e.g., Santana) and selecting the navigation description, such as by depressing a right arrow of the input mechanism 106 (FIG. 1).

The DSS 110 (FIG. 1) then determines if the menu selection is a leaf node, at step 208. In an alternative preferred embodiment, the user may select a currently playing media file, which has the same effect as selecting a navigation description that is determined to be a leaf node. In yet another preferred embodiment, the leaf node is a media file. If the menu selection is not a leaf node (208-No), then the DSS also determines if the selection is a power off selection, at step 210.

Figure 3B:
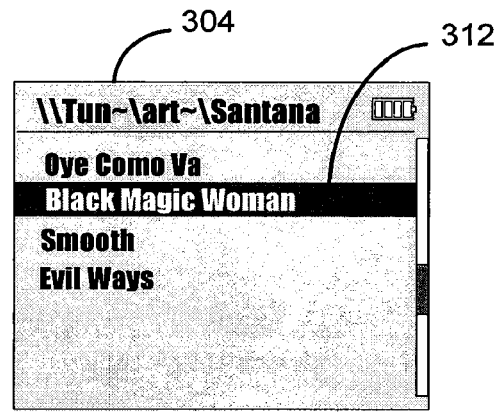

If the selection is not a leaf node (208-No) and if the selection is not a power off selection (210-No), then the DSS 101 (FIG. 1) accesses one or more navigation records from the navigation database 110 (FIG. 1), at step 212. For example, with reference to FIG. 3A, Santana is an artist's name, not a leaf node (and also not a power off selection). Accordingly, when Santana is selected, the display driver 102 (FIG. 1) displays an exemplary navigation menu structure display 304 (FIG. 3B).

If the selection is not a leaf node (208-No), but is a power off selection (210-No), the portable device 120 (FIG. 1) powers off.

When a leaf node is selected (208-Yes), the DSS 101 (FIG. 1) accesses extra information from the action database 112 (FIG. 1), at step 214. The extra information includes one or more action records for performing an action that is associated with the leaf node. It should be appreciated that in alternative embodiments, the "leaf node" need not be an actual leaf node such that a selection of an item that is not a leaf node could trigger the same response as selecting a leaf node in this preferred embodiment. In such an alternative, a leaf node may be associated with a media file and a parent node of the leaf may be associated with an album or a playlist. A user of the portable device 120 (FIG. 1) selects the album, which is not a leaf node, triggering an action menu, as described below. The action menu in this embodiment preferably includes at least one action description associated with an action that acts on the album, rather than an individual media file of the album.

In a preferred embodiment, the display driver 102 (FIG. 1) displays an icon or other indicator in association with a navigation description. The icon lets the user of the portable device 120 (FIG. 1) know that the navigation description is selectable to display an associated action menu.

The display driver 102 (FIG. 1) subsequently constructs an action menu, at step 216, with one or more action descriptions that are associated with the corresponding one or more action records. The action menu is displayed on the display mechanism 104 (FIG. 1), at step 217. For example, with reference to FIG. 3B, the highlighted navigation description 312 is a media file—in this case, the song "Black Magic Woman" by Santana. When "Black Magic Woman" is selected, an action menu display 308 (FIG. 3C) is displayed. In an alternative embodiment, the DSS 101 (FIG. 1) compares a field of an action record with a requisite value to determine whether to display the associated action description in the action menu. For example, an action description may only be displayed for media files that are downloaded from a specific Web site. Such media files would have a corresponding meta-data field, including a requisite value that an action field of an action record must have to be displayed in association with the selection of the media file. Since the menus are database driven, any field may be compared with a requisite value.

Figure 3C:
Figure 4:
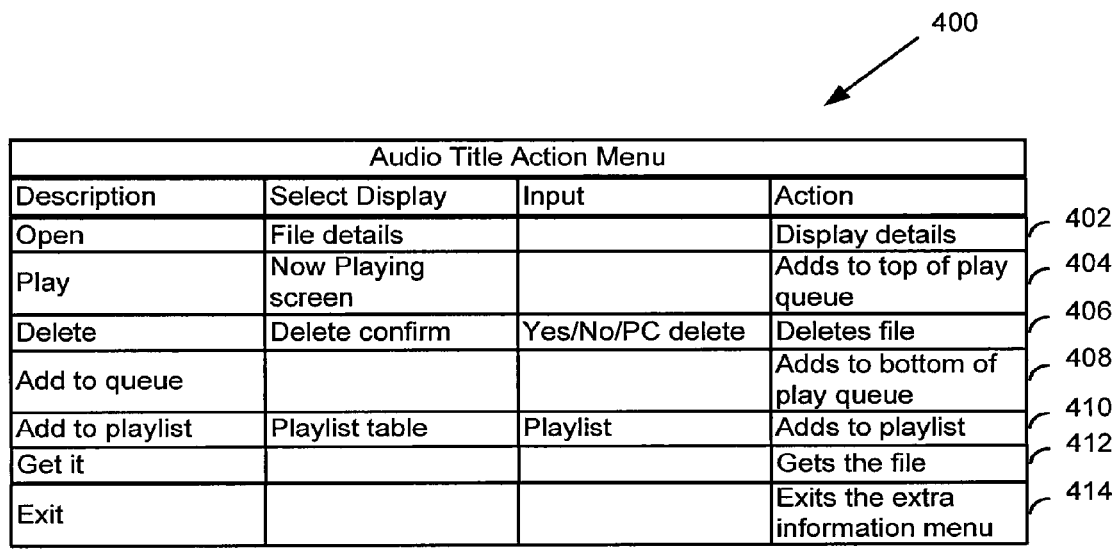
FIG. 4 is a representation of an action menu entry, according to an embodiment of the present invention.

Next, the DSS 101 (FIG. 1) receives a menu selection of an action description, at step 218, as input by the user of the portable device 120 (FIG. 1) via the input mechanism 106 (FIG. 1). FIG. 3C shows several action descriptions, such as "Get more like this," "Buy from musicnet," and "Buy from amazon." FIG. 4 illustrates a Table 400 that lists actions and their associated data. FIG. 4 shows additional fields for records associated with an action description, such as select display, input, and action. TABLE 400 includes the records open 402, play 404, delete 406, add to queue 408, add to playlist 410, get it 412, and exit 414.

If the action description is for an action that requires additional user input (220-yes), the DSS 101 (FIG. 1) accesses the relevant interaction interface data from the action database 112 (FIG. 1), at step 222, the display driver 102 (FIG. 1) displays the interaction interface on the display mechanism 104 (FIG. 1), at step 224, and the DSS receives the interactive information from the user via the input mechanism 106 (FIG. 1), at step 226.

For example, with reference to FIG. 4, if the action description "delete" for the record 406 is selected, the DSS 101 (FIG. 1) determines that the record 406 has an input field entry and displays the relevant information (e.g., the choices "Yes/No/PC delete") in a "delete confirm" display (not illustrated) and the DSS receives the interactive selection from the user to delete a file.

The DSS 101 (FIG. 1) determines if the menu selection calls for interactive input from the user at step 220. The DSS also determines if the user would like to cancel the limitation of the action associated with the menu selection at step 228. The DSS then determines whether to act now or wait until synchronizing with the computer 140 (FIG. 1), at step 230. The DSS determines whether to act now or later by checking a field of the action record associated with the selected action description.

If the action description is for an action that does not require additional user input (220-No) and that action is cancel (228-yes), then the DSS 101 (FIG. 1) accesses one or more navigation records from the navigation database 110 (FIG. 1), at step 212 and continues at step 204. For example, with reference to FIG. 4, if the action description "exit" for the record 414 is selected then the action menu is canceled. Note that in one embodiment, the DSS does not need to access the navigation database when "exit" is selected because the action menu overlays the navigation menu display and the action menu is simply removed from the display.

If the action description is for an action that does not require additional user input (220-No) and that action is not canceled (228-No), then the DSS 101 (FIG. 1) determines whether to act now, at step 230. If the DSS can execute the action now (230-yes), the DSS initiates the action, at step 232. For example, with reference to FIG. 4, if the action description "play," for the record 404, is selected, the DSS plays the media file. While playing, the display driver 102 (FIG. 1) preferably displays a "now playing screen." In an alternative embodiment, the record 404 has an input field for media files that are not currently stored in the media file database 108 (FIG. 1). The input field may prompt for interactive information from the user regarding whether to download or get the media file.

After an action has been acted upon, at step 232, the DSS 101 (FIG. 1) also determines whether to act later, at step 234. If the DSS is not to act later (234-No), go to step 212. Otherwise (234-Yes), the DSS initiates an action request at step 236. An example of when the DSS may act both now and later is when the action description "delete," for the record 404, is selected. In this example, the DSS deletes the media file. Then, the DSS initiates an action request so that the computer 140 (FIG. 1) is instructed to make changes to the relevant databases upon synchronization.

If the DSS 101 (FIG. 1) determines not to act now (230-No), the DSS initiates an action request, at step 236. After initiating an action request, go to step 212. With reference to FIG. 4, if the action description "get it," for the record 412, is selected, the DSS will initiate an action request to download the media file later when the portable device 120 (FIG. 1) is synchronized with the computer 140 (FIG. 1). In a preferred embodiment, the download location is an Internet address that is stored in the EAR database 114 with the menu selection. In an alternative embodiment, the download location is associated with the record entry in the media database 158. In another alternative embodiment, the portable device can download the media file action by accessing the computer through, for example, the wireless interface 118 (FIG. 1). It should be noted that even in the wireless embodiment, an action request may be initiated.

For action requests that are to be acted upon later, an EAR record is stored in the EAR database 114 (FIG. 1), including any data that is necessary for executing the action. In a preferred embodiment, some of the data that is necessary for executing the action is taken from the navigation database 110 (FIG. 1) and stored in the EAR record. Since the menu structure of the portable device 120 (FIG. 1) is database-driven, information may be obtained from the navigation database based upon location in the menu structure without requiring additional input via the input mechanism 106 (FIG. 1). In an alternative preferred embodiment, an action identifier is also stored in the EAR record. The action identifier enables the computer 140 (FIG. 1) to detect the type of action to be taken at the synchronization level.

Figures 7A, 7B, 7C:
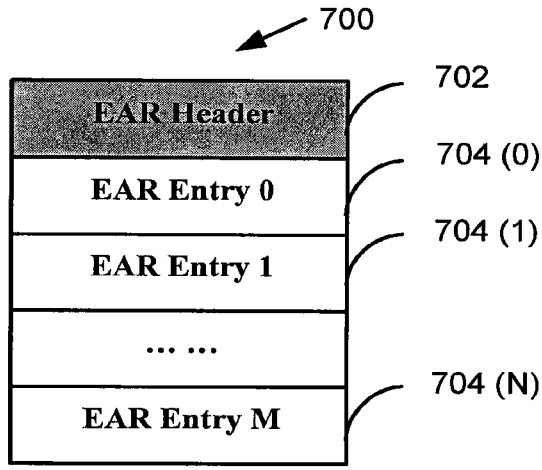
FIGS. 7A, 7B, and 7C are extra action request data formats, as used in an embodiment of the present invention.

An exemplary EAR data structure 700 is illustrated in FIG. 7A. It includes an EAR header 702 and EAR entries 704 (0)

to 704 (N). An exemplary EAR header 702 is illustrated in FIG. 7B, and an exemplary EAR entry 704 is illustrated in FIG. 7C. The EAR file format is preferably an ASCII text file with an extension. The EAR file format is intended to achieve the following: (1) passing various requests between the portable device 120 (FIG. 1) and the computer 140 (FIG. 1); (2) protecting requests by signature and checksum algorithm; and (3) stream based structure to prevent data loss due to file corruption. From the perspective of a user of the portable device 120, the EAR files are transparent.

As illustrated in FIG. 7B, the EAR file header 702 comprises a first word 706, a second word 708, a first pair of words 710, a 10-word group 712, and a second pair of words 714. A word comprises 16 sequentially-ordered bits. In alternative embodiments, a word comprises more or less than 16 sequentially-ordered bits. The first word 706 is a manufacturer ID. For example, the manufacturer ID for COMPANY A is 0x4449. The second word is a product ID. This is a unique product identifier that is assigned by the manufacturer. The first pair of words 710 is the device OS version specifier. The 10-word group 712 is reserved for future use. The second pair of words 714 is the EAR file signature, which may be 0x06212002.

As illustrated in FIG. 7C, the EAR file entry 704 comprises a first word 716, a second word 718, a third word 720, a group of words 722, and a fourth word 724. The first word 716 comprises a sync ID, which may be 0xFFFD. Each entry 704 preferably has the same sync ID. The second word 718 comprises a length entry, which is the length of the entry in words, excluding the sync ID. The third word 720 comprises an action identifier. The group of words 722 is data supporting the EAR action associated with the action identifier. The number of words in the group of words 722 varies depending upon the EAR action. The fourth word 724 is a checksum for the words included in the second word 718, the third word 720, and the group of words 722. An exemplary checksum function accepts a pointer to an unsigned word array for an EAR entry and returns an unsigned 16-bit word checksum.

A trigger (not illustrated) may also be associated with an action record. The trigger can be activated by scanning databases for specific field values. When activated, the action record is displayed in an action menu for a selected navigation description. For example, if an artist field of the navigation record associated with a selected navigation description has the value "Santana," then an action item "get Santana's latest album" would be triggered and included in the action menu. The portable device 120 (FIG. 1) is advantageously designed to use database entries for displaying tables and menu items. Thus, there are many values available to trigger the display of extra information menu items.

FIGS. 5A-5C illustrate an action menu data format 500 (FIG. 5A) and related data formats 510 (FIG. 5B) and 520 (FIG. 5C). The action menu data format 500 includes a first word 502, a second word 504, and a variable number of word groups 506 (0) to 506 (N). The first word 502 comprises a dataLength entry. The dataLength entry is the length of the action menu data structure in 16-bit words.

The second word 504 comprises a reserved entry, a dspTmplt entry, and an itemNum entry. The dspTmplt entry is the designation of the display template used to display the action menu. For example, a value of 0000 indicates a simple text list display template and a value of 0001 indicates a composite text and icon list display template. The itemNum entry is the number of items in the action menu.

The word groups 506 (0) to 506 (N) are headerOfItemX entries, where "X" is a whole number designation from 0 to N. Each word group comprises six words that are arranged as illustrated in FIG. 5B.

FIG. 5B illustrates a preferred format for the header 510 of an action menu item. The header 510 includes a first word 512, a second word 514, a first pair of words 516, and a second pair of words 518. The first word 512 comprises an action menu type and an action identifier. In an exemplary embodiment, a value of 00 indicates a type of action that is completed on the portable device 120 (FIG. 1), a value of 01 indicates a type of action that is completed on the computer 140 (FIG. 1), and a value of 10 indicates an interactive information menu. Device-completed actions preferably include power off, reboot, turning on or off a radio transmitter or receiver, shuffling play order for media files, repeat, play, delete, remove, add to default play list, open detailed information about a file, or exit an extra information menu. Actions completed on the computer 140 preferably include identifying a media file, identifying the origin of a media file, designating an extra information menu for download to the portable device 120, getting information from a database and generating instructions therewith, selecting an email address and sending email, and getting more music by a specific artist. Interactive actions preferably include getting a specified file from a computer or e-mailing a file to a specified address. The action identifier, together with the type, defines a specific action. Preferably, only an extra information menu registered with a valid action identifier is supported by the portable device 120. The second word 514 is reserved.

The first and second pair of words 516 and 518 are pointers. The first pair of words 516 is a pointer to action display data and the second pair of words 518 is a pointer to data supporting an action. The display data is illustrated in FIG. 5C, below. The format of the data supporting an extra information menu action varies widely (not illustrated).

FIG. 5C illustrates a preferred action data format 520. The action data format 520 includes a first word 522 and a variable number of additional words 524.

The first word 522 comprises a display data type and dataLength. In an exemplary embodiment, a value of 00 indicates a display data type of pure text, a value of 01 indicates a display data type of graphical, and a value of 10 indicates a display data type of composite (i.e., both text and graphical). The dataLength entry is the length of the display data in 16-bit words.

The additional words 524 comprise a data array. The data array includes display data for the action menu.

Note that in an alternative embodiment, the action menu does not have a data format 500 per se. Rather, each action record has a data format 510 and the action menu is generated "on the fly" when a navigation description is selected.

Figure 6:
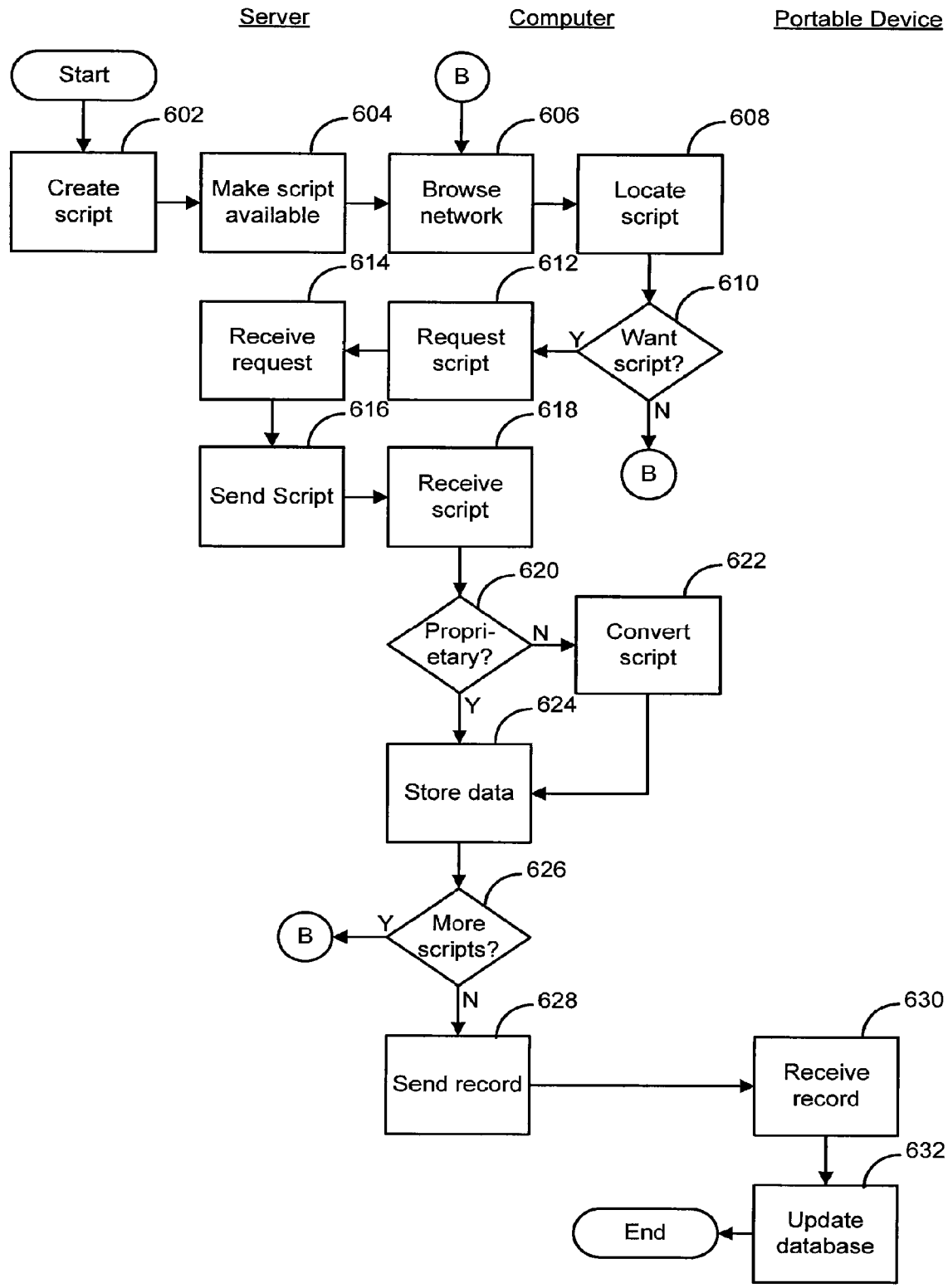
FIG. 6 is a flowchart illustrating updating the action database in a portable device, according to an embodiment of the present invention.

In a preferred embodiment, the action database 112 (FIG. 1) is updated by third parties. FIG. 6 shows an exemplary method of updating the action database. First, an author creates an action script, at step 602, for updating the action database. An action script is a script that provides for the addition of one or more action records in the action database. The script may provide data that is in a proprietary format so that the action database can be updated with the data as formatted. The proprietary format is preferably a pre-determined format that is established by the manufacturer or merchant of the portable device 120 (FIG. 1). Alternatively, the script may provide data that is not in a proprietary format, which requires a conversion to the proprietary format. The script may also call for some user interaction to select preferences and to modify the values associated with fields of the action records. The author of an action script may be a third party, such as an agent of a music Web site who wants to update a user's portable media device menu to enable purchasing of media files from the music Web site. The script is preferably made available on a server that is coupled to the network 130 (FIG. 1). The user of the computer 140 (FIG. 1) uses the browser 150 (FIG. 1) to browse the network, at step 606, and locate the script at step 608. If the user decides he doesn't want the script, he simply continues browsing as before (go to step 606). If the user decides he wants the script (610-yes), then the browser requests the script from the server, at step 612. The server receives the request, at step 614, and sends the script to the requesting browser, at step 616. The browser subsequently receives the script, at step 618.

One of the application programs 156 (FIG. 1) in the computer's memory is preferably an action menu tool that enables the computer to determine whether the description file is sufficiently related to a proprietary database format. If not (620-No), the action menu tool converts the script into the proprietary format. In an alternative preferred embodiment, the script calls the synchronization manager 154 (FIG. 1), which queries the user as to preferences for how to display the action menu or menu item associated with the script. In any case, eventually the proprietary format is stored on the computer, at step 622, in the EAR database 164 (FIG. 1). If the user wants more scripts (626-Yes), he continues browsing (go to step 606). If not (626-No), during synchronization, the synchronization manager accesses the EAR database to determine what action requests have been stored therein and sends one or more records including data from the proprietary format to the portable device 120 (FIG. 1), at step 628. In another embodiment, the synchronization manager also accesses the action database 162 (FIG. 1) in order to update it. In this embodiment, the action database 162 drives the action database 112 (FIG. 1) of the portable device. In any case, the portable device receives the records, at step 630. The action database is then updated with the record, at step 632. In a preferred embodiment, the action database is updated by the synchronization manager. In an alternative embodiment, the record is provided to the DSS 101 (FIG. 1), which updates the action database.

In another alternative embodiment, the synchronization manager 154 (FIG. 1) sends an EAR data structure from the EAR database 164 (FIG. 1) to the DSS 101 (FIG. 1). The DSS then executes the actions contained in the EAR data structure.

After or during synchronization, the computer 140 (FIG. 1) preferably generates a log file (not illustrated).

During synchronization, the synchronization manager 154 (FIG. 1) accesses the EAR database 114 (FIG. 1) and obtains an EAR data structure. As indicated above, the synchronization manager may also access EAR database 164 (FIG. 1) and obtain an EAR data structure. For illustrative purposes, the EAR database 114 is discussed below. The EAR database 164, however, could be accessed in a similar manner, and the EAR records executed by either the synchronization manager or the DSS 101 (FIG. 1), in alternative embodiments. The EAR records in the EAR database 164 may request that the computer 140 (FIG. 1) perform actions such as downloading files from the network 130 (FIG. 1) or updating the databases 108-112 (FIG. 1) with the contents of databases 158-162 (FIG. 1). Table 1 shows the name of exemplary EAR actions, the values of their action identifiers, and descriptions of the actions:

TABLE 1

| Name | Value | Description |
|---|---|---|
| ADD_PC_AUDIO_2Q | 0x0000 | Direct the computer to send specified audio file to the portable device and to add it to the default play queue. |
| ADD_DEVICE_AUDIO_2Q | 0x0001 | Inform the computer that an audio record has been added to the default play queue. |
| ADD_RECORDINGS | 0x0002 | Inform the computer that a recording file has been added to an audio database. |
| DELETE_PC_AUDIO | 0x0010 | Direct the computer to delete a specified audio file and to update the audio database. |
| DELETE_DEVICE_AUDIO | 0x0011 | Inform the computer that an audio file has been deleted. |
| FORMAT_ME | 0x0020 | Direct the computer to format the portable device. |
| GET_AUDIO_FILE | 0x0030 | Direct the computer to send a specified audio file to the portable device and to add it to the audio database, if not already added. |
| REMOVE_FROM_QUEUE | 0x0050 | Inform the computer that a record has been removed from the default play queue. |
| REQUEST_AUDIO_FILE | 0x0060 | Direct the computer to request a specified audio file from a Web site |

In an alternative embodiment, the EAR entry is an EAR record stored in the EAR database 114 (FIG. 1).

At the synchronization layer, or on the portable device 120 (FIG. 1) itself in the connected embodiment, preferences are configured for a site so as to allow a variety of information to be sent automatically to the computer 140 (FIG. 1), or the portable device in the connected embodiment. In general, the DSS 101 (FIG. 1) uses the context and position of the action description selection to provide the bulk of the information that is sent to the synchronization manager 154 (FIG. 1). This can be illustrated with the following examples (in the following examples, the "portable device" is the portable device 120 of FIG. 1, the "network" is the network 130 of FIG. 1, the "computer" is the computer 140 from FIG. 1, the "synchronization manager" is the synchronization manager 154 of FIG. 1, and the "DSS" is the DSS 101 of FIG. 1):

EXAMPLE 1

Using a "Recommendation Engine"

1. Using a computer, a user browses (FIG. 6, step 606) a network with a Web site on which an action menu addition script (FIG. 6, 608) for a "recommendation engine" is found;
2. The user clicks on that script's link (FIG. 6, 612);
3. The computer receives the script (FIG. 6, 618);
4. The script calls the synchronization manager;
5. The synchronization manager queries the user regarding preferences for how the designated action menu should appear on their portable device;
6. The synchronization manager loads (FIG. 6, 628) data associated with the action menu, such as one or more action records, into the action database 112 (FIG. 1) in accordance with the preferences the next time the portable device is synchronized with the computer;
7. When the DSS obtains (FIG. 2, step 206) a menu selection that corresponds to a media file, an action menu is constructed (FIG. 2, 216) with action descriptions from the action database 112, including an action description, such as "recommend from XYZ Corp.," associated with the data loaded in step 6;

8. When the DSS accepts (FIG. 2, 218) a menu selection, such as "recommend from XYZ Corp.," the DSS initiates an action request (FIG. 2, 236);

9. When the portable device is synchronized with the computer, the synchronization manager searches the EAR database 114 (FIG. 1) for the EAR record associated with the action request;

10. The synchronization manager then passes along media file meta-data to XYZ Corp. in accordance with the action identified by the EAR record and the action data stored in the EAR record; and 11. When the synchronization manager receives a return response from XYZ Corp., preferably in real time, it sends recommendations meta-data or media files to the portable device, completing the recommendation transaction.

EXAMPLE 2

Using a Recommendation-based Music Service

1. Using a computer, a user browses (FIG. 6, step 606) a network with a Web site on which an action menu addition script (FIG. 6, 608) for a "recommendation service" from XYZ Corp. is found;
2-6. Same as Example 1, above;
7. When the DSS obtains (FIG. 2, step 206) a menu selection that corresponds to a media file that the recommendation service has pushed onto the portable device, the DSS constructs (FIG. 2, 216) an action menu;
8. The action menu includes action menu items that make use of associated media file meta-data, such as "get more from this artist" or "get music from similar artists," and other actions involving related songs, albums or artists;
9. The portable device displays an interaction interface (FIG. 2, 224) from which the user selects (FIG. 2, 226) artists, tracks, albums, or genres for subsequent download;
10. The portable device then initiates an action request (FIG. 2, 236);
11. When the portable device is synchronized with the computer, the synchronization manager searches the EAR database 114 (FIG. 1) for the EAR record associated with the action request, in this case to download media files;
12. The synchronization manager then passes along media file meta-data and/or a download request to XYZ Corp. in accordance with the action identified by the EAR record and the action data stored in the EAR record; and
13. When the synchronization manager receives a return response from XYZ Corp., preferably in real time in this case, it sends meta-data or media files to the portable device, completing the recommendation service.

EXAMPLE 3

Using an Interactive Push Music Service

1. Using a computer, a user browses (FIG. 6, step 606) a network with a Web site on which an action menu addition script (FIG. 6, 608) for an "interactive push service" from XYZ Corp. is found;
2-6. Same as Example 1, above;
7. The synchronization manager receives media files from the interactive push service;
8. The synchronization manager passes the media files onto the portable device;
9. The DSS obtains (FIG. 2, 206) a media file selection for a media file that has been passed (or pushed) onto the portable device and is currently playing;
10. The DSS constructs (FIG. 2, 216) an action menu with action descriptions from the action database 112 related to the media file, such as "play this song more often," "play this artist less often," "leave this song on the device," "I like this type of music," etc.;
11. When the DSS accepts (FIG. 2, 218) a menu selection, such as "play this song more often," the DSS initiates an action request (FIGS. 2, 236); and
12. When the portable device is synchronized with the computer, the synchronization manager searches the EAR database 114 (FIG. 1) for the EAR record associated with the action request, in this case instructing the XYZ Corp. to make corresponding modifications to the media files that are to be pushed onto the portable device (e.g., retain some media files, update some media files, and update some music preferences).

NOTE: In an embodiment, "commercials" for recommended media files are included with media file downloads and if the user wants those recommended media files, they can be designated for future download.

EXAMPLE 4

Using an Action Menu Script to Email a Media File Link

1. Using a computer, a user browses (FIG. 6, step 606) a network with a Web site on which an action menu addition script (FIG. 6, 608) for an "email a friend service" from XYZ Corp. is found;
2-6. Same as Example 1, above;
7. The DSS obtains (FIG. 2, 206) a media file selection for a media file that is currently playing;
8. The DSS constructs (FIG. 2, 216) an action menu with action descriptions from the action database 112, at least one of which is related to the email a friend service, such as "email this track";
9. When the DSS accepts (FIG. 2, 218) a menu selection, such as "email this track," the DSS populates (FIG. 2, 204) a navigation menu so that the user may designate an email recipient (e.g., by searching an address book);
10. Optionally, the user records a narrative to be sent with the email;
11. The DSS then initiates an action request (FIGS. 2, 236); and
12. When the portable device is synchronized with the computer, the synchronization manager searches the EAR database 114 (FIG. 1) for the EAR record associated with the action request, in this case sending the selected media file link and recipient information to the email a friend service.

EXAMPLE 5

Using an Action Menu Script to Email a Media File

1. Using a computer, a user browses (FIG. 6, step 606) a network with a Web site on which an action menu addition script (FIG. 6, 608) to "email a media file";
2-13. Same as Example 4, above; and
14. When the portable device is synchronized with the computer, the synchronization manager searches the EAR database 114 (FIG. 1) for the EAR record associated with the action request, in this case sending the selected media file and recipient information via the computer's email system.

EXAMPLE 6

Using an Action Menu to Designate a Catalog Media File for Download

1. Using a computer, a user browses (FIG. 6, step 606) a network with a Web site on which an action menu addition script (FIG. 6, 608) for a "get this file" is found;
2-6. Same as Example 1, above;
7. The user designates a database or a portion of a database for synchronization;
8. The synchronization manager copies data associated with media files (but not the media files themselves) into the navigation database 110 and/or the action database 112;
9. The user browses the navigation menu structure (FIG. 2, 204-212), which includes browsing through, for example, favorite genres, playlists, or stations;
10. When the DSS obtains (FIG. 2, step 206) a menu selection that corresponds to a media file not on the portable device, the DSS constructs (FIG. 2, 216) an action menu with action descriptions from the action database 112, including an action description, such as "get this file";
11. When the DSS accepts (FIG. 2, 218) a menu selection, such as "get this file," the DSS initiates an action request (FIG. 2, 236);
12. When the portable device is synchronized with the computer, the synchronization manager searches the EAR database 114 (FIG. 1) for the EAR record associated with the action request, in this case to get one or more files; and
13. The synchronization manager provides the media files and (optionally) additional metadata associated with the media file in accordance with the action identified by the EAR record and the action data stored in the EAR record.

EXAMPLE 7

Turning Narration on and Off Using an Action Menu

1. A playlist author creates a playlist with "narration" or additional commentary;
2. The playlist author associates an action menu script with the playlist that allows listeners to turn off the narration;
3. Using a computer, the user designates the playlist for download;
4. The synchronization manager downloads the playlist and the action menu script, if necessary; and
5. The synchronization manager loads (FIG. 6, 628) data associated with the action menu, such as one or more action records, into the action database 112 (FIG. 1) in accordance with the preferences the next time the portable device is synchronized with the computer and provides the portable device with the downloaded playlist;
6. When the DSS obtains (FIG. 2, step 206) a menu selection that corresponds to a media file in the playlist, an action menu is constructed (FIG. 2, 216) with action descriptions from the action database 112, including an action description, such as "turn on/off narration";
7. When the DSS accepts (FIG. 2, 218) a menu selection, such as "recommend from XYZ Corp.," the DSS initiates an action (FIG. 2, 232), in this case turning on/off the narration.

EXAMPLE 8

Subscribing to a Periodically Updated "Radio Show"

1. Using a computer, a user browses (FIG. 6, step 606) a network with a Web site on which an action menu addition script (FIG. 6, 608) for a "playlist download and prioritization service" is found;
2-6. Same as Example 1, above;
7. A catalog of periodically updated playlists is provided on the network;
8. Using a computer, the user designates one or more playlists for periodic download (the frequency of the periodic download may vary based upon the frequency the playlist is updated or based upon other factors);
9. The synchronization manager receives the periodically updated playlists and overwrites older versions of the playlist; and
10. When the DSS obtains (FIG. 2, step 206) a menu selection that corresponds to a media file, an action menu is constructed (FIG. 2, 216) with action descriptions from the action database 112, including an action description, such as "download playlist," associated with the data loaded in step 6;
11. When the DSS accepts (FIG. 2, 218) a menu selection, such as "download playlist," the DSS initiates an action request (FIG. 2, 236);
12. When the portable device is synchronized with the computer, the synchronization manager searches the EAR database 114 (FIG. 1) for the EAR record associated with the action request;
13. The synchronization manager then acts in accordance with the action identified by the EAR record, in this case providing one or more playlists and the action data stored in the EAR record, which may include a prioritization of playlists (in case there is not enough space on the portable device for all desired playlists); and
14. When the synchronization manager receives a return response from XYZ Corp., preferably in real time, it sends recommendations meta-data or media files to the portable device, completing the recommendation transaction.

It should be appreciated that the above described Examples may be used in combination with one another. For example, Examples 2 and 6, when combined, might yield an alternative method for browsing for subsequent downloads. Namely, a particular media file is associated with its particular database segment and presents browsing that segment as an action menu entry. For example, when highlighting a media file that belongs to the "alternative country" genre of music_co.com the action menu could present an entry "browse alt. Ctry. mp3" which would send the user to that segment of that particular database, and once there, the user could employ the action menu to specify any relevant media files for download.

It should also be appreciated that an action script need not be downloaded if the action menu associated with the script is already available. For example, in a preferred embodiment, "get this file" is pre-installed on the portable device as an action menu description. Accordingly, steps 1-6 of Example 6, above, are not necessary in a preferred embodiment.

It should further be appreciated, that although an off-line synchronization embodiment is described above, a real-time connection (e.g., wireless) embodiment may also be employed. The primary difference between the two is found in the caching of information on the portable device 120, including the caching of EAR files 118, and the role of the computer 140, is not necessarily required if connected in real-time.

The foregoing descriptions of specific embodiments of the present invention are presented for purposes of illustration and description. They are not intended to be exhaustive or to limit the invention to the precise forms disclosed. Obviously many modifications and variations are possible in view of the above teachings. For example, any of the aforementioned embodiments or methods, may be combined with one another. The embodiments were chosen and described in order to best explain the principles of the invention and its practical applications, to thereby enable others skilled in the art to best use the invention and various embodiments with various modifications as are suited to the particular use contemplated. Furthermore, the order of steps in the method are not necessarily intended to occur in the sequence laid out. It is intended that the scope of the invention be defined by the following claims and their equivalents.

We claim:

1. A method of operating a portable device comprising:
    displaying on the portable device a navigation menu with navigation descriptions of navigation records populated from a navigation database on said portable device;
    obtaining on said portable device a navigation selection of one of the navigation descriptions, wherein said navigation selection is inputted into said portable device;
    determining on said portable device that the navigation selection is associated with a media file;
    constructing on said portable device an action menu with action descriptions of action records stored on the portable device, wherein at least one action record is customizable by downloading data to said portable device from an external device;
    accepting on said portable device an action selection of one of the action descriptions;
    initiating on said portable device an action associated with the action selection; and
    downloading onto said portable device the media file, wherein the media file is stored remotely before being downloaded onto said portable device.

2. The method of claim 1 further comprising downloading an action script, including action data, from a remote source; and storing the action data in an action record.

3. The method of claim 1 wherein a navigation record includes a plurality of navigation fields and one of the plurality of navigation fields comprises a navigation description, the method further comprising:
    deciding on said portable device whether to display an action description for an action record of the action records by comparing an action field of the action record to a requisite value.

4. The method of claim 3 further comprising determining the requisite value from one of the plurality of navigation fields.

5. The method of claim 1 further comprising, after said accepting, displaying on said portable device an interaction interface.

6. A method of operating a portable device comprising:
    populating on the portable device a navigation menu with navigation descriptions of navigation records stored in a navigation database, wherein the navigation database providing a plurality of navigation descriptions per navigation record;
    obtaining on said portable device a navigation selection of one of the navigation descriptions, wherein said navigation selection is input into said portable device;
    determining on said portable device that the navigation selection is associated with a media file;
    constructing on said portable device an action menu with action descriptions of action records stored on the portable device, wherein at least one action record is customizable by downloading data to said portable device from an external device;
    accepting on said portable device an action selection of one of the action descriptions;
    initiating on said portable device an action associated with the action selection; and
    downloading onto said portable device the media file, wherein the media file is stored remotely before being downloaded onto said portable device.

7. The method of claim 6 further comprising downloading an action script, including action data, from a remote source; and storing the action data in an action record.

8. The method of claim 6 wherein a navigation record includes a plurality of navigation fields and one of the plurality of navigation fields comprises a navigation description, the method further comprising deciding on said portable device whether to display an action description for an action record of the action records by comparing an action field of the action record to a requisite value.

9. The method of claim 8, further comprising:
    determining the requisite value from one of the plurality of navigation fields.

10. The method of claim 6 further comprising, after said accepting, displaying on said portable device an interaction interface.

11. A method of operating a portable device comprising:
    populating on the portable device a navigation menu with navigation descriptions of navigation records from a navigation database, wherein navigation is achieved by a plurality of navigation descriptions;
    obtaining on said portable device at least one action record from an external device;
    storing on said portable device the obtained at least one action record in an action database;
    obtaining on said portable device a navigation selection of one of the navigation descriptions, wherein said navigation selection is input into said portable device;
    determining on said portable device that the navigation selection is associated with a media file;
    constructing on said portable device an action menu with action descriptions of action records stored on the portable device including the at least one action record from the external device;
    accepting on said portable device an action selection of one of the action descriptions; and
    initiating on said portable device an action associated with the action selection.

12. The method of claim 11 wherein a navigation record includes a plurality of navigation fields and one of the plurality of navigation fields comprises a navigation description, the method further comprising deciding on said portable device whether to display an action description for an action record of the action records by comparing an action field of the action record to a requisite value.

13. The method of claim 12 further comprising determining the requisite value from one of the plurality of navigation fields.

14. The method of claim 11 further comprising, after said accepting, displaying on said portable device an interaction interface.

15. The method of claim 11, wherein:
    the action records stored on the portable device include one or more action records, different from the at least one action record from the external device, with action descriptions indicating one or more actions different from action descriptions of the at least one action record from the external device.

16. The method of claim 15, wherein:
the action selection is one of the action descriptions of the at least one action record from the external device.

17. The method of claim 15, wherein:
the action selection is one of the action descriptions of the one or more action records different from the at least one action record from the external device.

18. The method of claim 15, wherein obtaining on said portable device at least one action record from an external device further includes:
downloading on said portable device data corresponding to the at least one action record from the external device; and
generating on said portable device the at least one action record based on the data corresponding to the at least one action record.

* * * * *